US009337969B2

(12) United States Patent
Raghavan et al.

(10) Patent No.: US 9,337,969 B2
(45) Date of Patent: May 10, 2016

(54) LOW-FREQUENCY ASSISTED METHODS FOR BEAMFORMING, TIMING AND FREQUENCY OFFSET IN MM-WAVE ACCESS SYSTEMS

(71) Applicant: QUALCOMM Incorporated, San Diego, CA (US)

(72) Inventors: Vasanthan Raghavan, North Bruswick, NJ (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 14/333,449

(22) Filed: Jul. 16, 2014

(65) Prior Publication Data

US 2016/0020876 A1  Jan. 21, 2016

(51) Int. Cl.
| H04B 7/06 | (2006.01) |
| H04W 88/08 | (2009.01) |
| H04B 1/00 | (2006.01) |
| H04W 24/08 | (2009.01) |
| H04W 76/00 | (2009.01) |
| H04L 5/00 | (2006.01) |
| H04W 76/02 | (2009.01) |

(52) U.S. Cl.
CPC ............ *H04L 5/0023* (2013.01); *H04B 7/0617* (2013.01); *H04L 5/006* (2013.01); *H04W 24/08* (2013.01); *H04W 76/02* (2013.01); *H04B 1/005* (2013.01); *H04W 88/08* (2013.01)

(58) Field of Classification Search
CPC ...... H04B 7/04; H04B 7/0695; H04L 1/1825; H04L 1/1867
See application file for complete search history.

(56) References Cited

U.S. PATENT DOCUMENTS

| 7,652,624 | B2 * | 1/2010 | Li et al. ...................... 342/367 |
| 8,639,270 | B2 * | 1/2014 | Moshfeghi ................. 455/456.5 |
| 2013/0301563 | A1 | 11/2013 | Gupta et al. |
| 2014/0044044 | A1 | 2/2014 | Josiam et al. |
| 2014/0071961 | A1 | 3/2014 | Nigam et al. |
| 2014/0072078 | A1 | 3/2014 | Sergeyev et al. |
| 2014/0148107 | A1 | 5/2014 | Maltsev et al. |

FOREIGN PATENT DOCUMENTS

WO    2013086164 A1    6/2013

OTHER PUBLICATIONS

International Search Report and Written Opinion—PCT/US2015/037002—ISA/EPO—Sep. 22, 2015.

\* cited by examiner

*Primary Examiner* — Ayaz Sheikh
*Assistant Examiner* — Debebe Asefa
(74) *Attorney, Agent, or Firm* — Arent Fox LLP

(57) ABSTRACT

A method, an apparatus, and a computer program product for operating a user equipment (UE) are provided. The apparatus determines a first set of beamforming directions for communication with a base station (BS) in a first network, monitors for beams in a second set of beamforming directions for communication with a millimeter wave base station (mmW-BS) based on the determined first set of beamforming directions, where the second set of beamforming directions includes the first set of beamforming directions, and where the mmW-BS is in a second network having a higher carrier frequency than the first network, and establishes a communication link with the mmW-BS based on a beamforming direction in the second set of beamforming directions.

20 Claims, 12 Drawing Sheets

LOW-FREQUENCY ASSISTED METHODS FOR BEAMFORMING, TIMING AND FREQUENCY OFFSET IN MM-WAVE ACCESS SYSTEMS

BACKGROUND

1. Field

The present disclosure relates generally to communication systems, and more particularly, to low-frequency assisted methods for beamforming, and timing and frequency offset estimation in millimeter wave (mmW) access systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus determines a first set of beamforming directions for communication with a base station (BS) in a first network, monitors for beams in a second set of beamforming directions for communication with an mmW-BS based on the determined first set of beamforming directions, where the second set of beamforming directions includes the first set of beamforming directions, and where the mmW-BS is in a second network having a higher carrier frequency than the first network, and establishes a communication link with the mmW-BS based on a beamforming direction in the second set of beamforming directions.

DETAILED DESCRIPTION

Figure 1:
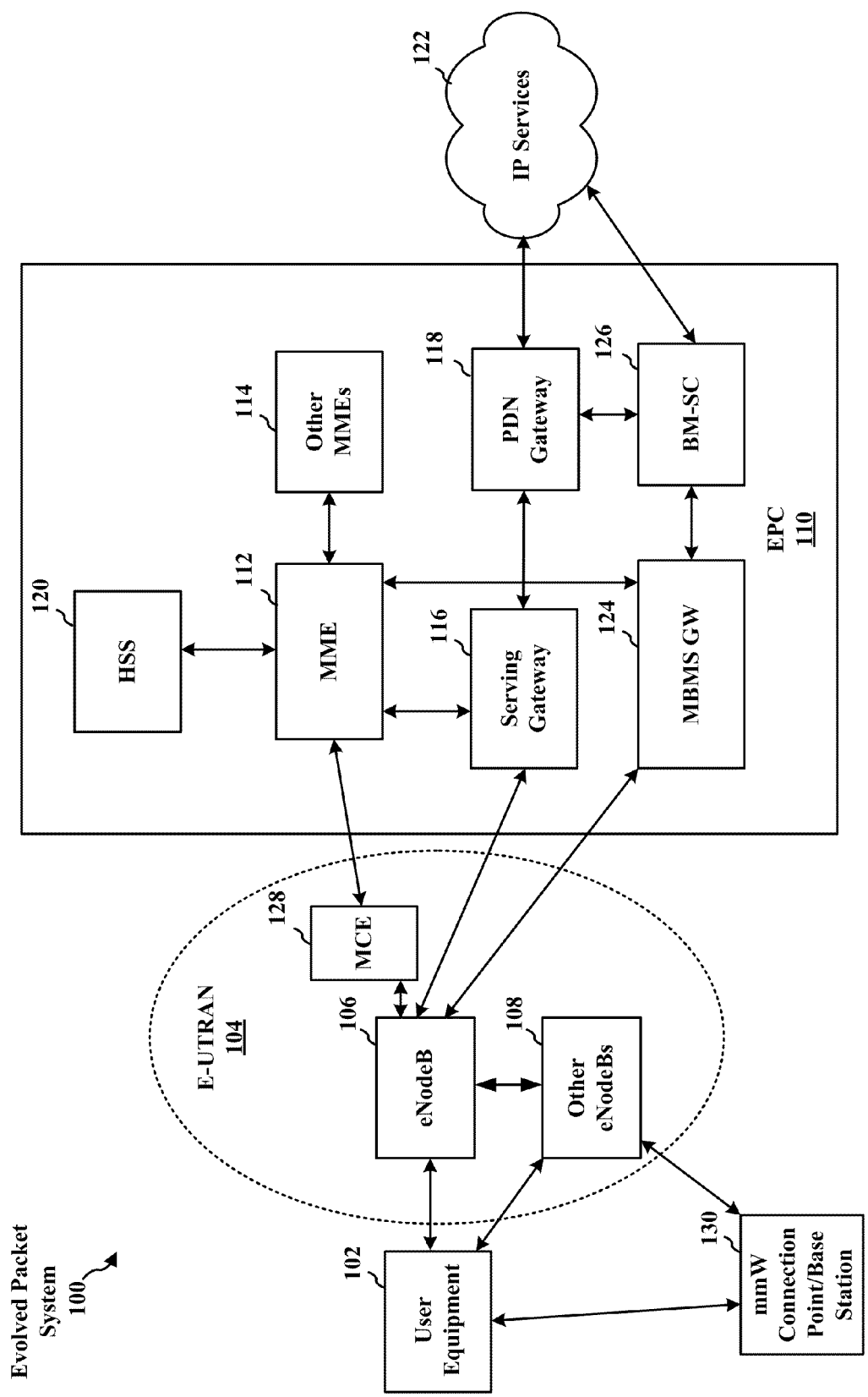
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and an mmW system. Accordingly, the UE 102 may communicate with the eNB 106 and/or the other eNBs 108 over a LTE link. Additionally, the UE 102 may communicate with a connection point (CP), a base station (BS) (capable of mmW system communication), or a millimeter wave base station (mmW-BS) 130 over an mmW link.

In a further aspect, at least one of the other eNBs 108 may be capable of communicating signals via the LTE network and the mmW system. As such, an eNB 108 may be referred to as a LTE+mmW eNB. In another aspect, the CP/BS/mmW-BS 130 may be capable of communicating signals via the LTE network and the mmW system. As such, the CP/BS/mmW-BS 130 may be referred to as a LTE+mmW CP/BS/mmW-BS. The UE 102 may communicate with the other eNB 108 over a LTE link as well as over a mmW link.

In yet another aspect, the other eNB 108 may be capable of communicating signals via the LTE network and the mmW system, while the CP/BS/mmW-BS 130 is capable of communicating signals via the mmW system only. Accordingly, the CP/BS/mmW-BS 130 unable to signal the other eNB 108 via the LTE network may communicate with the other eNB 108 over a mmW backhaul link.

Figure 2:
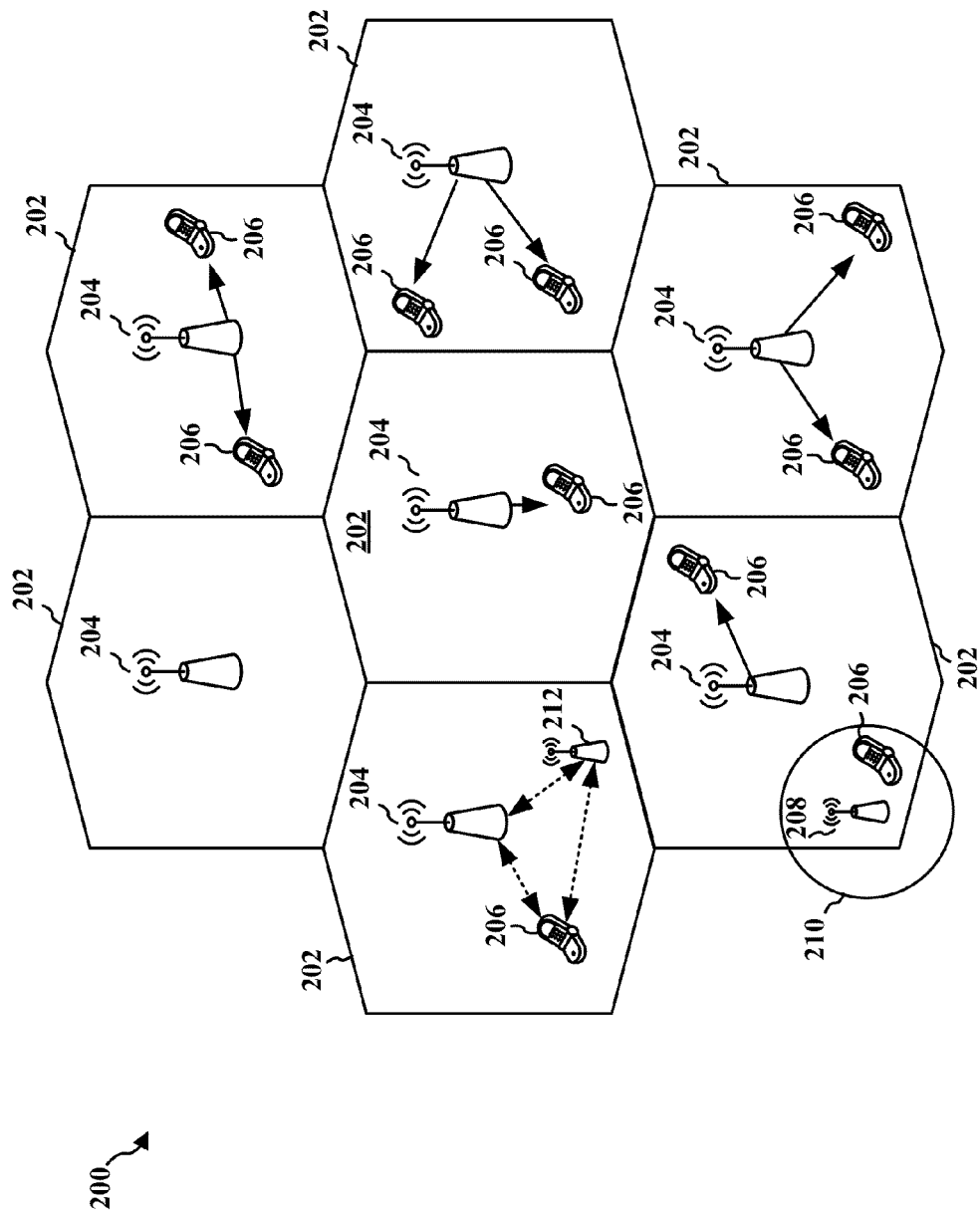
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and an mmW system. Accordingly, the UE 206 may communicate with the eNB 204 over a LTE link and communicate with a CP or BS 212 (capable of mmW system communication) over a mmW link. In a further aspect, the eNB 204 and the CP/BS/mmW-BS 212 may communicate signals via the LTE network and the mmW system. As such, the UE 206 may communicate with the eNB 204 over a LTE link and an mmW link (when the eNB 204 is capable of mmW system communication), or communicate with the CP/BS/mmW-BS 212 over an mmW link and a LTE link (when the CP/BS/mmW-BS 212 is capable of LTE network communication). In yet another aspect, the eNB 204 communicates signals via the LTE network and the mmW system, while the CP/BS/mmW-BS 212 communicates signals via the mmW system only. Accordingly, the CP/BS/mmW-BS 212 unable to signal the eNB 204 via the LTE network may communicate with the eNB 204 over an mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
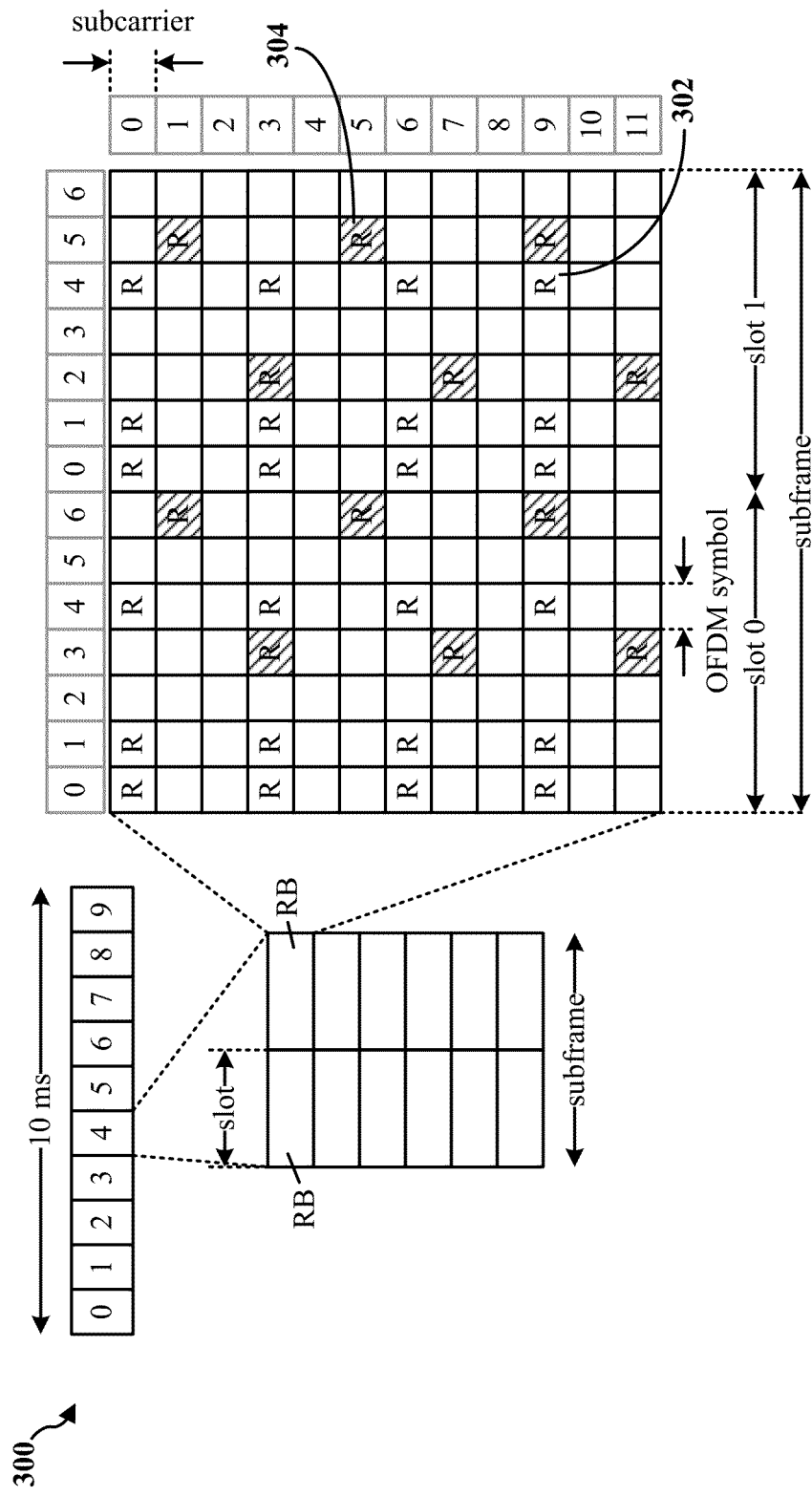
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
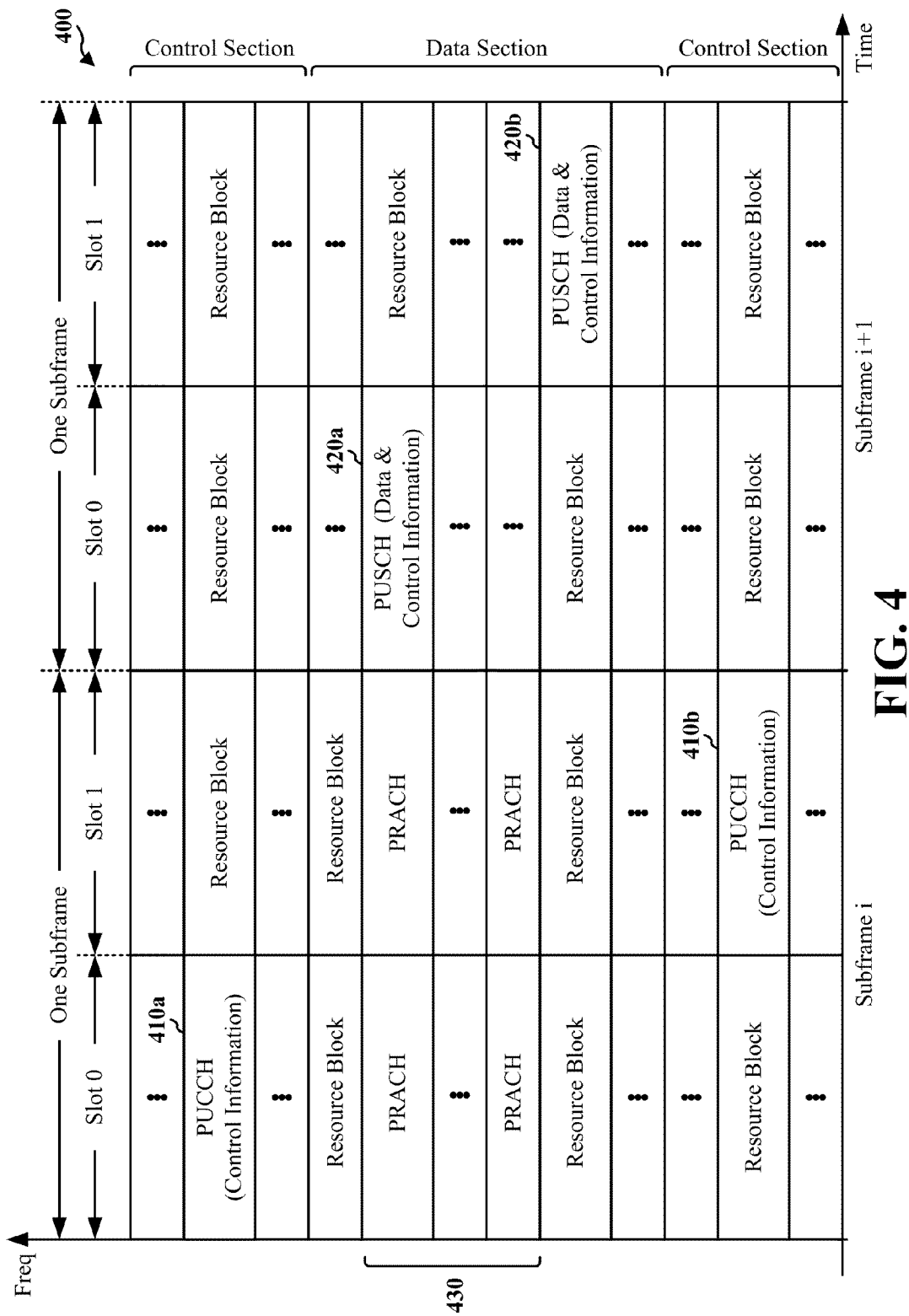
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
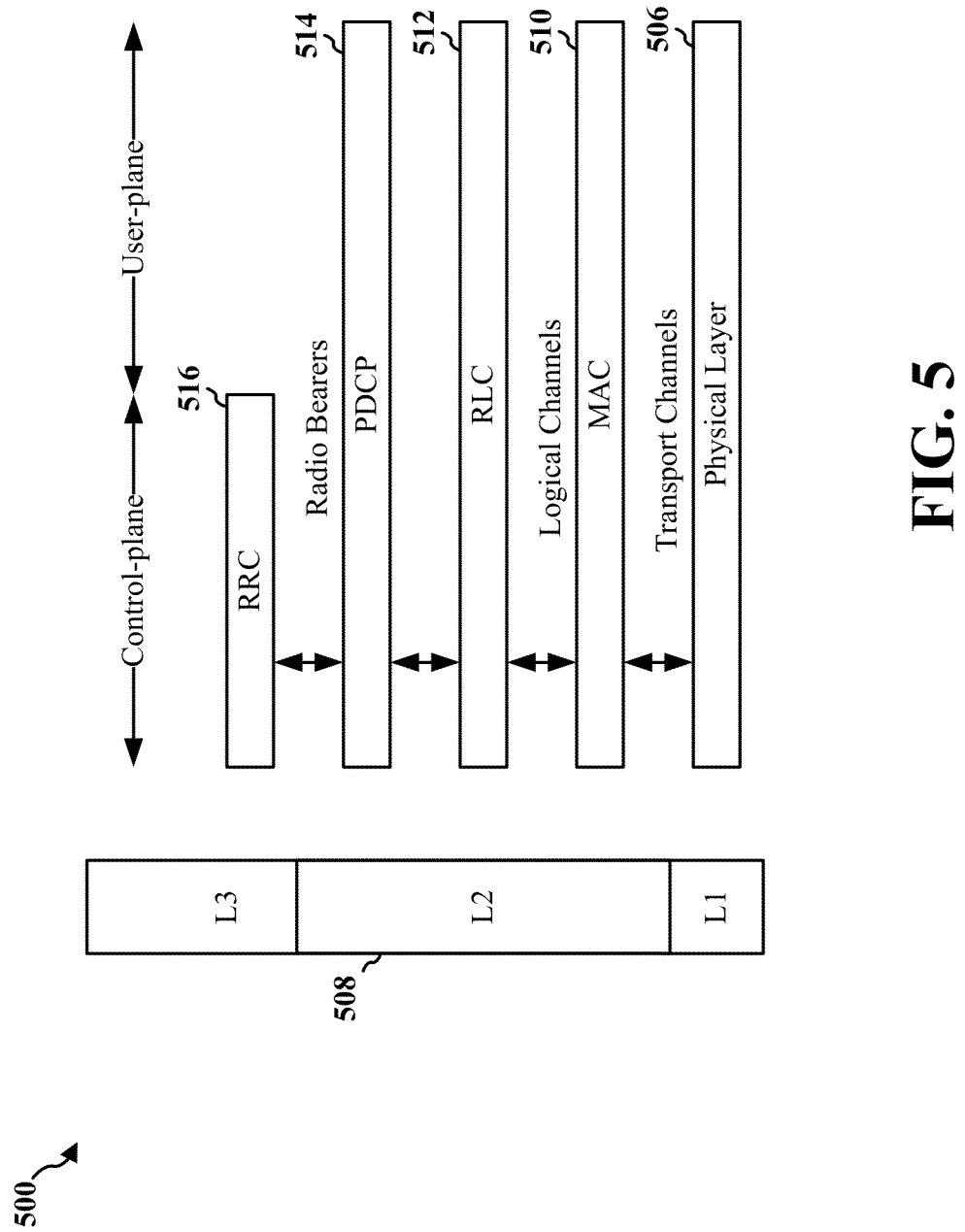
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
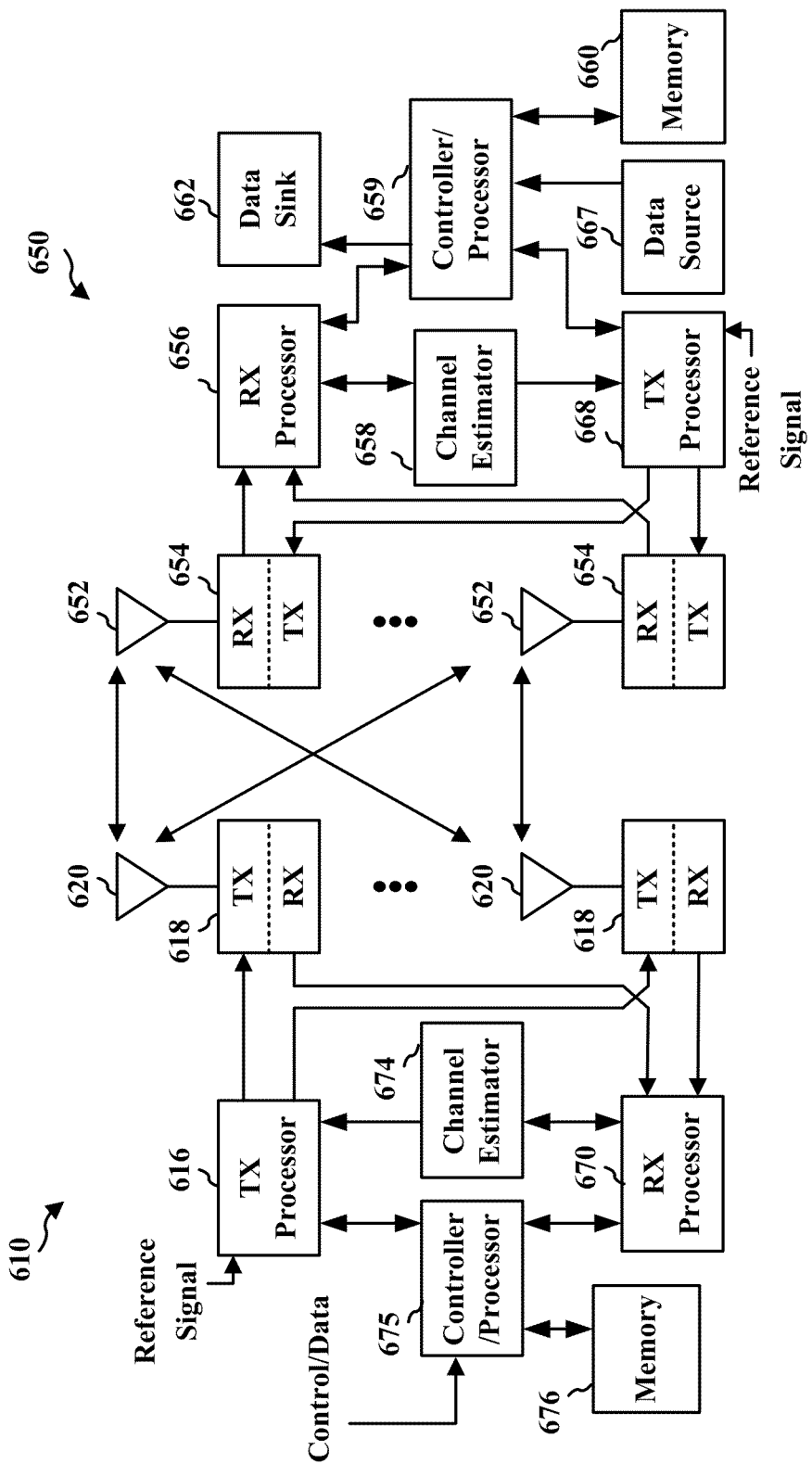
FIG. 6 is a diagram illustrating an example of an evolved Node B and user equipment in an access network.

FIG. 6 is a block diagram of a base station 610 in communication with a UE 650 in an access network. The base station 610 may be, for example, an eNB of a LTE system, a connection point (CP)/access point/base station of an mmW system, an eNB capable of communicating signals via the LTE system and the mmW system, or a connection point (CP)/access point/base station capable of communicating signals via the LTE system and the mmW system. The UE 650 may be capable of communicating signals via the LTE system and/or the mmW system. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654 RX receives a signal through its respective antenna 652. Each receiver 654 RX recovers information modulated onto an RF carrier and provides the information to receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the DL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 610 in a manner similar to that described in connection with the receiver function at the UE 650. Each receiver 618 RX receives a signal through its respective antenna 620. Each receiver 618 RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
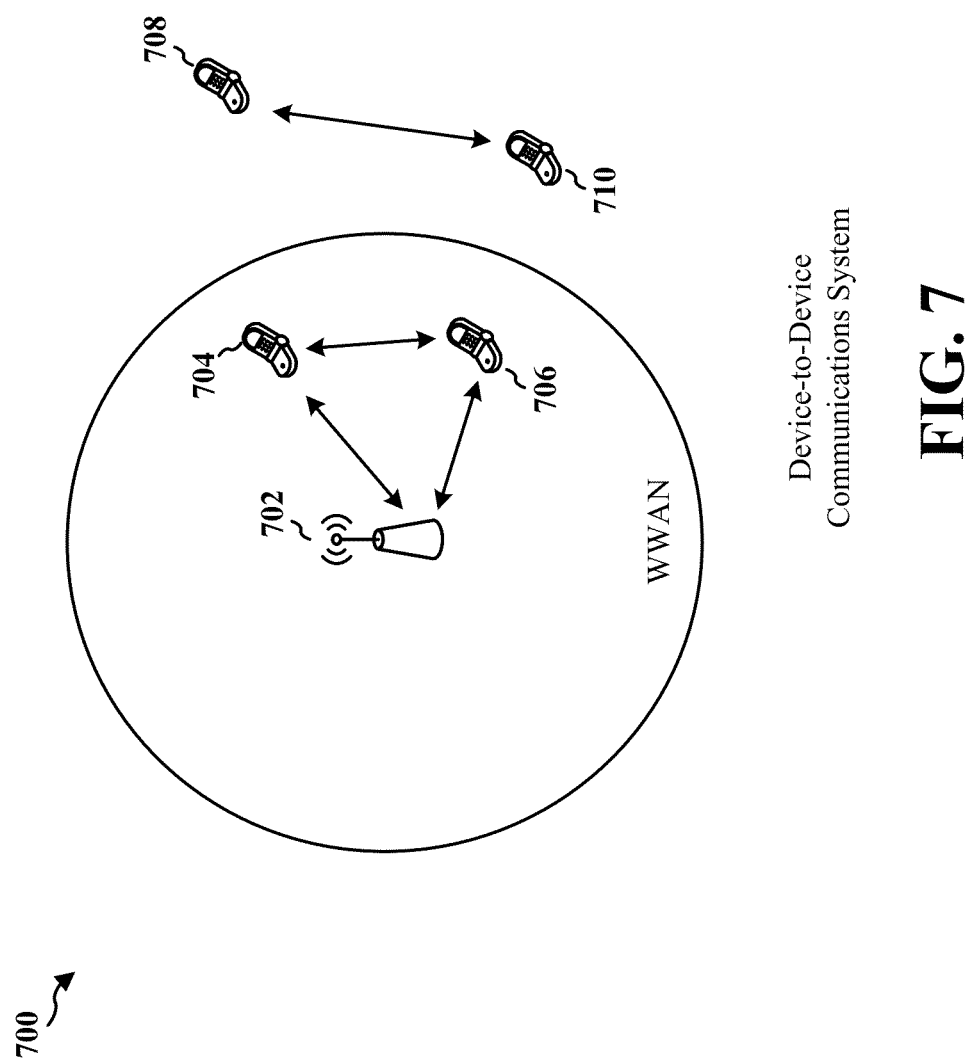
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

An mmW system implementing high data rate signaling may suffer from high propagation and penetration losses. A significant portion of these losses may be overcome by the use of multiple antennas, such as in the form of a phased array. More antennas may be packed within the same aperture/area in high-frequency wireless communication systems (e.g., an mmW wireless communication system using carriers in the frequency range of 10.0 GHz to 300.0 GHz) than in low-frequency wireless communication systems (e.g., an LTE network using carriers having frequencies below 6 GHz) since the carrier wavelength is substantially smaller at higher frequencies. One approach for signaling in mmW systems is physically-motivated array steering at both the transmitter and the receiver, which allows improvement of the link margin by obtaining the benefit of the array/beamforming gain. The physically-motivated array steering allows a high frequency reuse due to the highly directional nature of signaling as the half-power beam width of the array steering vector decreases with an increase in the number of antennas in the phased array.

Physically-motivated array steering in an mmW system is distinct from the manner in which beamforming protocols have been designed for low-frequency carrier systems in the current as well as the past generations of wireless standardization efforts. In such standardization efforts, approaches such as codebook-based or non-codebook based precoding schemes are commonly used.

Physically-motivated array steering may be achieved by discovery of angular information of the dominant multipath in a wireless channel. For example, the angular information may include an angle of departure in the azimuth and elevation and/or an angle of arrival in the azimuth and elevation. In an aspect, a high-frequency carrier system, such as an mmW system, may co-exist with a low-frequency carrier system, such as an LTE network. In such aspect, when the low-frequency carrier system is not used for establishing a communication link between the transmitter and the receiver, the low-frequency carrier system may be leveraged towards the mmW link establishment process.

Figure 8:
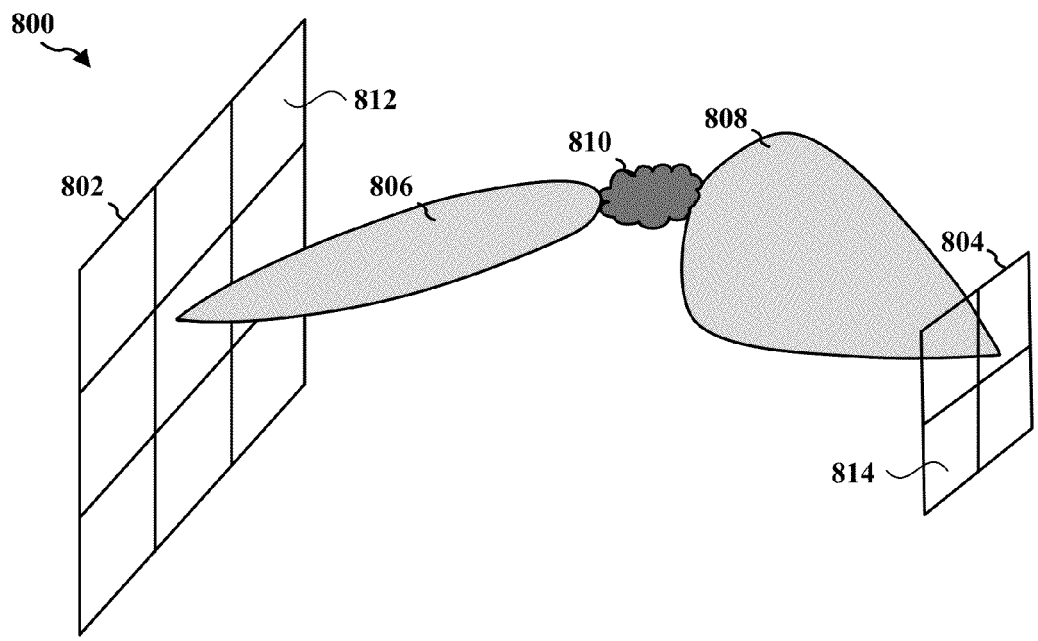
FIG. 8 is a diagram illustrating an example of beamforming in a low frequency wireless communication system.

FIG. 8 is a diagram 800 illustrating an example of beamforming in a low-frequency wireless communication system (e.g., LTE). FIG. 8 includes antenna arrays 802 and 804. In an aspect, the antenna array 802 may include a number of antenna elements (e.g., antenna element 812) arranged in a grid pattern (e.g., a planar array) and may be located in a BS. In such aspect, the antenna array 804 may include a number of antenna elements (e.g., antenna element 814) arranged in a grid pattern and may be located in a UE. As shown in FIG. 8, the antenna array 802 may transmit beam 806 and the antenna array 804 may receive via beam 808. In an aspect, the beams 806 and 808 may reflect, scatter, and/or diffract via the cluster located at area 810.

Figure 9:
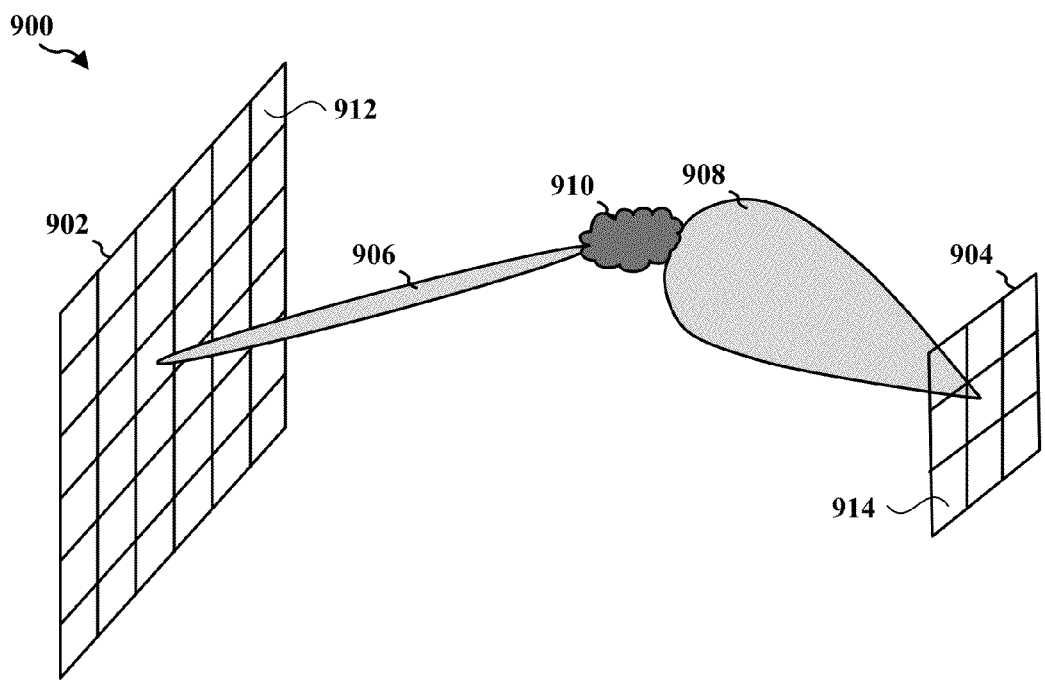
FIG. 9 is a diagram illustrating an example of beamforming in an mmW wireless communication system.

FIG. 9 is a diagram 900 illustrating beamforming in a high-frequency wireless communication system (e.g., an mmW system). FIG. 9 includes antenna arrays 902 and 904. In an aspect, the antenna array 902 may include a number of antenna elements (e.g., antenna element 912) arranged in a grid pattern and may be located in an mmW-BS. In such aspect, the antenna array 904 may include a number of antenna elements (e.g., antenna element 914) arranged in a grid pattern and may be located in a UE. As shown in FIG. 9, the antenna array 902 may transmit beam 906 and the antenna array 904 may receive via beam 908. In an aspect, the beams 906 and 908 may reflect, scatter, and/or diffract via the cluster located at area 910.

It should be noted that the antenna array 902 in FIG. 9 includes a greater number of antenna elements than the antenna array 802 in FIG. 8, and that the antenna array 904 in FIG. 9 includes a greater number of antenna elements than the antenna array 804 in FIG. 8. The greater number of antennas in the former scenario (relative to the latter) is because of the larger carrier frequency corresponding to smaller wavelengths that allows the deployment of a greater number of antennas within the same aperture/area. The greater number of antenna elements in antenna arrays 902 and 904 allow the beams 906 and 908 to have a narrow half-power beam width offering a high angular resolution relative to the beams 806 and 808 from antenna arrays 802 and 804. Therefore, the lower number of antenna elements in antenna arrays 802 and 804 in the low-frequency wireless communication system may result in a wider angular resolution, while providing a better link margin than in the mmW system.

In a stand-alone mmW wireless communication system, the high link losses (due to penetration, diffraction, reflection, etc.) may prevent discovery of the angular information of multipath. In contrast, a low-frequency wireless communication system may provide a link having a higher quality (e.g., a link having higher SNR) than a link in a stand-alone mmW wireless communication system. This higher SNR of the low-frequency wireless communication system and the coexistence of the low-frequency and the stand-alone mmW wireless communication systems may be leveraged to determine the angular information and/or relative path gains for the beamforming scheme. Since the angular information and/or relative path gains for the beamforming scheme is only determined by the relative geometries of the transmitter, the receiver, and the scatterers, such angular information and/or relative path gains are generally invariant in both stand-alone mmW and low-frequency wireless communication systems. While there are scenarios where the ranking (of dominance) of paths could change with changing carrier frequency (e.g., due to differential scattering and/or absorption losses at different frequencies), such ranking may not change in a majority of cases.

In an aspect, methods for learning angles of arrival and departure of beams successful at high SNR may be used to learn the angles of arrival and departure of beams in a low-frequency wireless communication system. Such methods may include MUltiple SIgnal Classification (MUSIC), Estimation of Signal Parameters via Rotation Invariant Techniques (ESPRIT), Space-Alternating Generalized Expectation-maximization (SAGE) algorithm, etc. In some scenarios, the wide beam widths of the low-frequency transmissions in low-frequency wireless communication systems may result in poor angular precision. In one aspect, the angles learned for the low-frequency wireless communication system may serve as a coarse estimate for the angles (also referred to as angular information) needed for beamforming in the mmW wireless communication system. A refined estimate of the angular information for the mmW wireless communication system may be determined using the coarse angle estimate obtained via the low-frequency wireless communication system as the initial value (also referred to as the seed value). For example, the refined estimate may be determined using algorithms, such as fine-beam tuning or constrained MUSIC.

In an aspect, latencies associated with initial discovery and synchronization procedures, beamforming processes, and/or link establishment for the mmW wireless communication system may be reduced using an iterated combination of a coarse angle estimation in the low-frequency wireless communication system followed by fine-beam tuning in the mmW wireless communication system. In an aspect, such an iterative process may include repeated use of the low-frequency wireless communication system followed by the mmW wireless communication system to improve the quality of the estimates of various quantities.

In an aspect, the asymmetric capabilities between an mmW wireless communication system and low-frequency wireless communication system may be leveraged to reduce complexity in the algorithms used to implement the mmW wireless communication system and low-frequency wireless communication system. For example, low-frequency wireless communication systems may use a fewer number of antennas than mmW wireless communication systems. Such asymmetry in number of antennas may be leveraged to estimate the probable signal directions in algorithms, such as MUSIC, ESPRIT and/or SAGE. It should be noted that estimating the probable signal directions with any such algorithm (e.g., MUSIC, ESPRIT, and/or SAGE) is based on obtaining an accurate estimate of the signal covariance matrix. For example, an accurate estimate of the signal covariance matrix may be achieved using a smaller number of training samples (or shorter covariance matrix acquisition and angle learning periods) and with lower computational cost (smaller number of multiplications and additions, and matrix inversion of smaller dimension) for smaller antenna systems than for larger dimensional systems.

In an aspect, the asymmetric capabilities between the transmitter and the receiver may be leveraged to proportionally allocate more resources for angle determination in the low-frequency wireless communication system than the mmW wireless communication system. For example, the asymmetric capabilities may include a different number of antennas at the transmitter and the receiver, different beamforming capabilities (e.g., digital beamforming capability or RF beamforming capability) between the transmitter and the receiver, and/or lower power at the receiver.

In an aspect, the cell frame and OFDM symbol timing information obtained from the low-frequency wireless communication system may be used as an initial value for further refinement with the mmW wireless communication system. In such aspect, since the low-frequency wireless communication system generally provides a better SNR than the mmW wireless communication system, these quantities may be estimated more reliably at lower frequencies (e.g., below 6.0 GHz) than at higher frequencies (e.g., frequencies between 10.0 GHZ to 300.0 GHz). In an aspect, the cell frame and/or OFDM symbol timing information may be determined using synchronization signals (e.g., primary synchronization signals (PSSs) and secondary synchronization signals (SSSs)) that enable a UE to synchronize with the cell and detect quantities of interest, such as cell frame timing, carrier frequency offset, OFDM symbol timing, and/or cell identification (ID).

In an aspect, the carrier frequency offset may be estimated for the mmW wireless communication system after fine-tuning around the estimate provided by the low-frequency wireless communication system. For example, the fine-tuning may be performed with a smaller number of frequency hypotheses. Therefore, low-frequency assistance may significantly enhance the performance of the mmW protocols with respect to latency, lower SNR requirements for the same performance, and/or lower computational cost.

Figure 10:
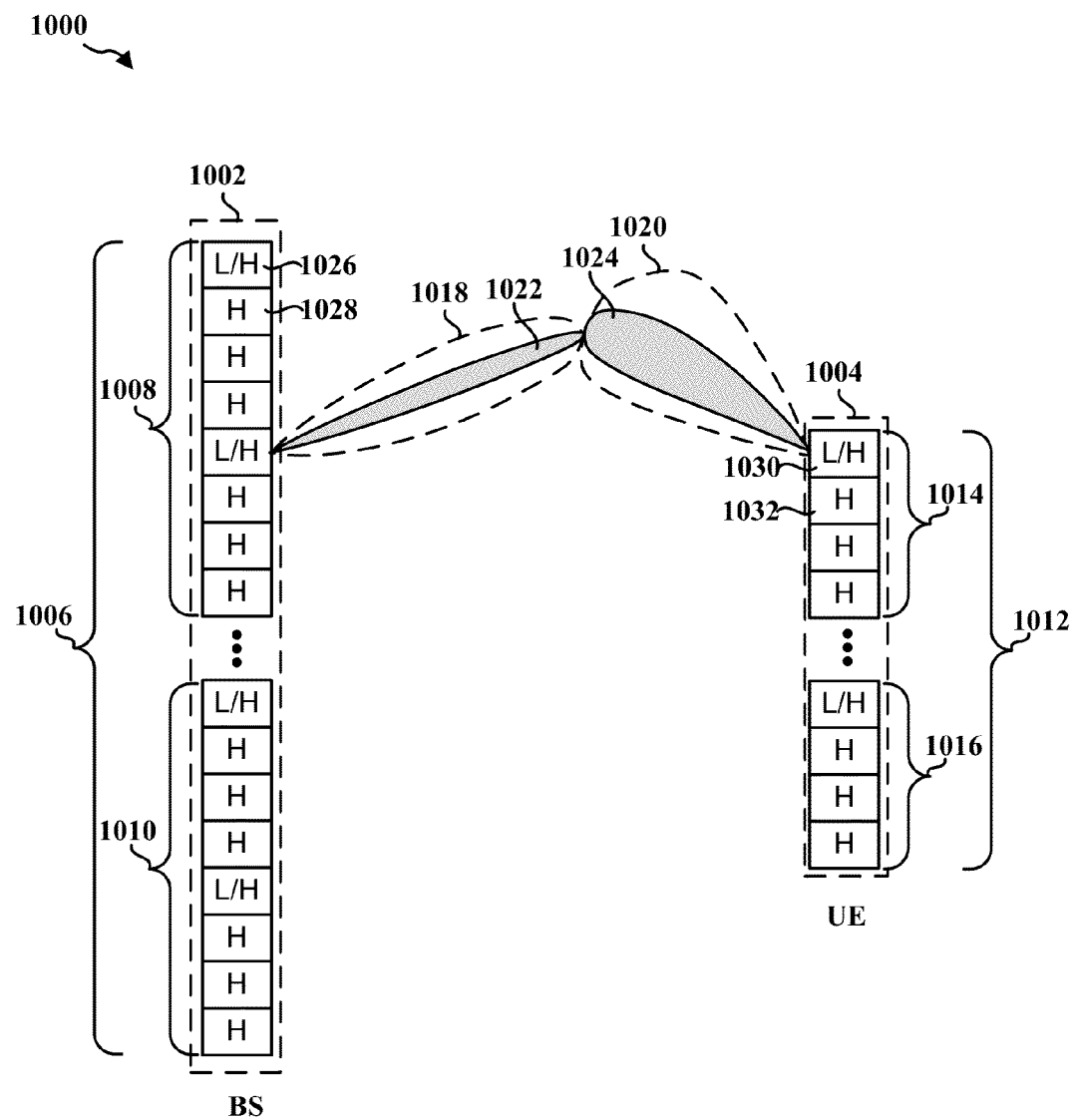
FIG. 10 is a diagram illustrating an example of a wireless communication system.

FIG. 10 is a diagram illustrating an example of a communication system 1000. In an aspect, the communication system 1000 may implement both a low-frequency communication system (e.g., a communication system operating at frequencies below 6.0 GHz, such as LTE) and a high-frequency communication system (e.g., a communication system operating at mmW frequencies between 10.0 GHZ to 300.0 GHz). As shown in FIG. 10, the communication system 1000 includes base station 1002 and UE 1004. In an aspect, the base station 1002 includes antenna array 1006 having a number of antenna elements, such as antenna elements 1026 and 1028. In an aspect, the antenna elements in antenna array 1006 may be grouped to form one or more antenna subarrays, such as antenna subarrays 1008 and 1010. In an aspect, the antenna elements in antenna array 1006 may be configured to transmit and/or receive using low-frequency carriers and/or high-frequency carriers. For example, antenna element 1026 may be configured by the base station 1002 to transmit and/or receive using either low-frequency or high-frequency carriers (designated as "L/H"), while antenna element 1028 may be configured by the base station 1002 to transmit and/or receive using high-frequency carriers (designated as "H").

In an aspect, the UE 1004 includes antenna array 1012 having a number of antenna elements, such as antenna elements 1030 and 1032. In an aspect, the antenna elements in antenna array 1012 may be grouped to form one or more antenna subarrays, such as antenna subarrays 1014 and 1016. In an aspect, the antenna elements in antenna array 1012 may be configured to transit and/or receive using low-frequency and/or high-frequency carriers. For example, antenna element 1030 may be configured by the UE 1004 to transmit and/or receive using either low-frequency or high-frequency carriers (designated as "L/H"), while antenna element 1032 may be configured by the UE 1004 to transmit and/or receive using high-frequency carriers (designated as "H").

In an aspect, the BS 1002 and/or the UE 1004 may determine beamforming directions of beams formed using low-frequency carriers. In an aspect, the beams formed using low-frequency carriers may be used by the BS 1002 and/or the UE 1004 to establish a low-frequency communication link (e.g., a wireless communication link established using LTE standards at frequencies below 6.0 GHz) between the BS 1002 and the UE 1004.

In an aspect, the BS 1002 and/or the UE 1004 may use physically-motivated antenna array steering in the low-frequency wireless communication system to determine an estimate of the angles of arrival and departure and/or relative gains of all or a subset of the dominant scattering paths between the base station 1002 and the UE 1004. For example, with reference to FIG. 10, the base station 1002 may determine the angles of arrival and departure and/or relative gain of the path associated with low-frequency carrier beam 1018 (indicated with dotted lines in FIG. 10) and the UE 1004 may determine the angles of arrival and departure and/or relative gain of the path associated with low-frequency carrier beam 1020 (indicated with dotted lines in FIG. 10). In an aspect, the base station 1002 and the UE 1004 may exchange the angles of arrival and departure and/or relative gain of the path associated with low-frequency carrier beams 1018 and 1020.

In an aspect, the base station 1002 and/or the UE 1004 may use the estimated values of the low-frequency carrier beams 1018 and 1020 as an initial value (also referred to as a seed value) to refine the angles and path gains for signaling using high-frequency carriers (e.g., carriers in the mmW frequency range of 10.0 GHz to 300.0 GHz). For example, the base station 1002 may use at least a portion of the estimated values as an initial value for the angles and path gains used to generate high-frequency carrier beam 1022 (indicated by the shaded region in FIG. 10) and the UE 1004 may use at least a portion of the estimated values as an initial value for the angles and path gains used to generate high-frequency carrier beam 1024 (indicated by the shaded region in FIG. 10). In an aspect, the estimated values of the low-frequency carrier beams 1018 and 1020 may be used by the base station 1002 and/or the UE 1004 to generate a multi-beam which may be refined for signaling using high-frequency carriers. In an aspect, the estimated values of the low-frequency carrier beams 1018 and 1020 may be used by the base station 1002 and/or the UE 1004 to estimate the angles and path gains by simplifying computations (number of multiplications and additions) in estimation algorithms (e.g., MUSIC, ESPRIT, or SAGE).

Figure 11:
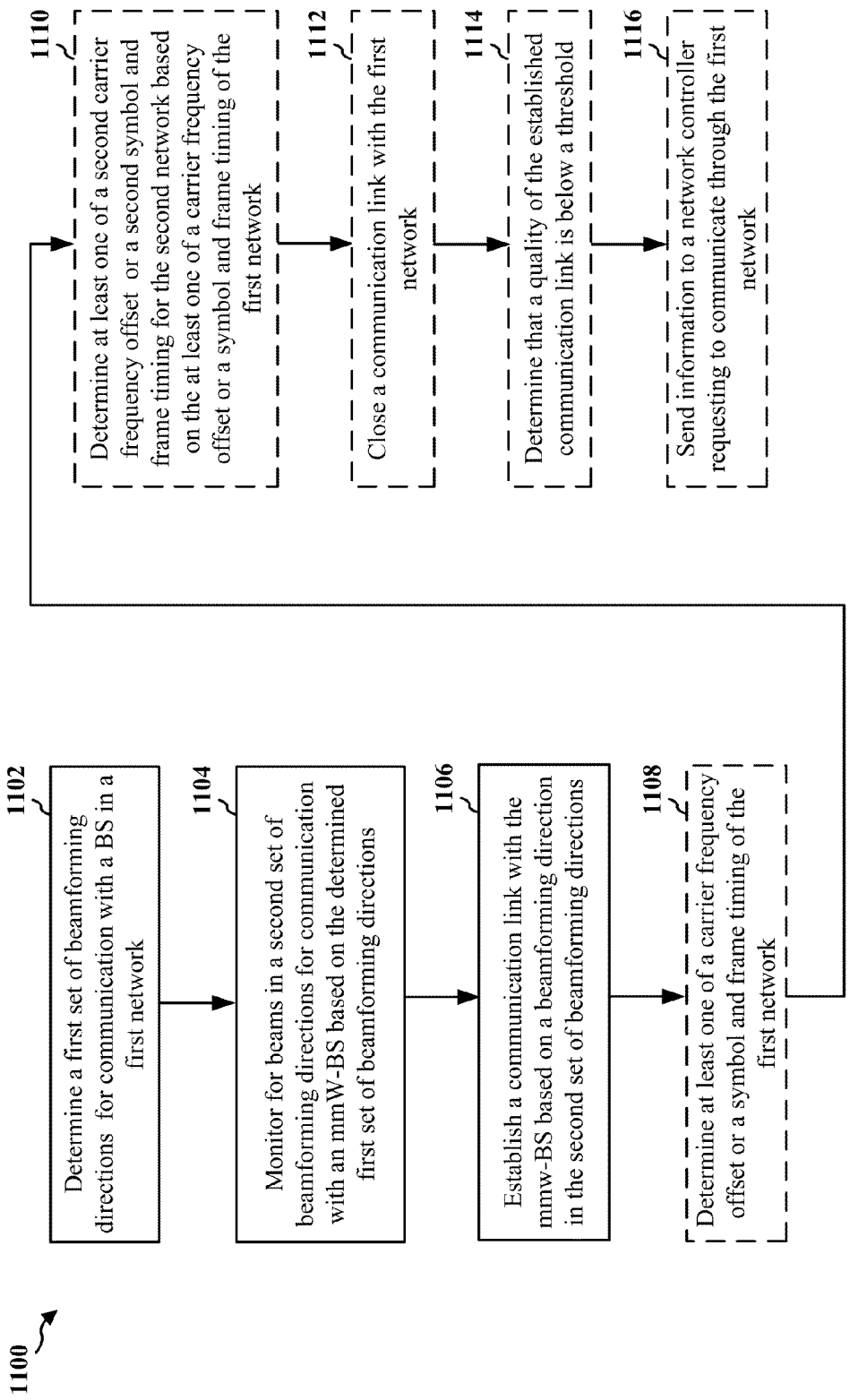
FIG. 11 is a flow chart of a method of wireless communication.

FIG. 11 is a flow chart 1100 of a method of wireless communication. The method may be performed by a UE (e.g., the UE 1004, the UE the apparatus 1202/1202'). It should be understood that the steps indicated in dotted lines in FIG. 11 represent optional steps.

At step 1102, the UE determines a first set of beamforming directions for communication with a BS (e.g., BS 1002) in a first network. In an aspect, the first network may be an LTE network using carriers having frequencies below 6.0 GHz. For example, the first set of beamforming directions may include an angle of departure in the azimuth and elevation and/or an angle of arrival in the azimuth and elevation for each of beams 1018 and/or 1020. In an aspect, the UE may determine the first set of beamforming directions using methods such as MUltiple SIgnal Classification (MUSIC), Estimation of Signal Parameters via Rotation Invariant Techniques (ESPRIT), and Space-Alternating Generalized Expectation-maximization (SAGE) algorithm.

At step 1104, the UE monitors for beams in a second set of beamforming directions for communication with an mmW-BS based on the determined first set of beamforming directions. In an aspect, the second set of beamforming directions may include the first set of beamforming directions and the mmW-BS may be in a second network having a higher carrier frequency than the first network. In an aspect, and with reference to FIG. 10, the BS of the first network and the mmW-BS of the second network may be collocated in a single base station, such as the BS 1002. For example, the second set of beamforming directions may correspond to the directions associated with beams 1022 and/or 1024.

At step 1106, the UE establishes a communication link with the mmW-BS based on a beamforming direction in the second set of beamforming directions. In an aspect, the first set of beamforming directions correspond to the first set of antennas and the second set of beamforming directions correspond to the second set of antennas. In an aspect, the first set of antennas is a subset of the second set of antennas.

At step 1108, the UE determines at least one of a carrier frequency offset or a symbol and frame timing of the first network.

At step 1110, the UE determines at least one of a second carrier frequency offset or a second symbol and frame timing for the second network based on the at least one of a carrier frequency offset or a symbol and frame timing of the first network.

At step 1112, the UE closes a communication link with the first network.

At step 1114, the UE determines that a quality of the established communication link is below a threshold.

Finally, at step 1116, the UE sends information to a network controller requesting to communicate through the first network.

Figure 12:
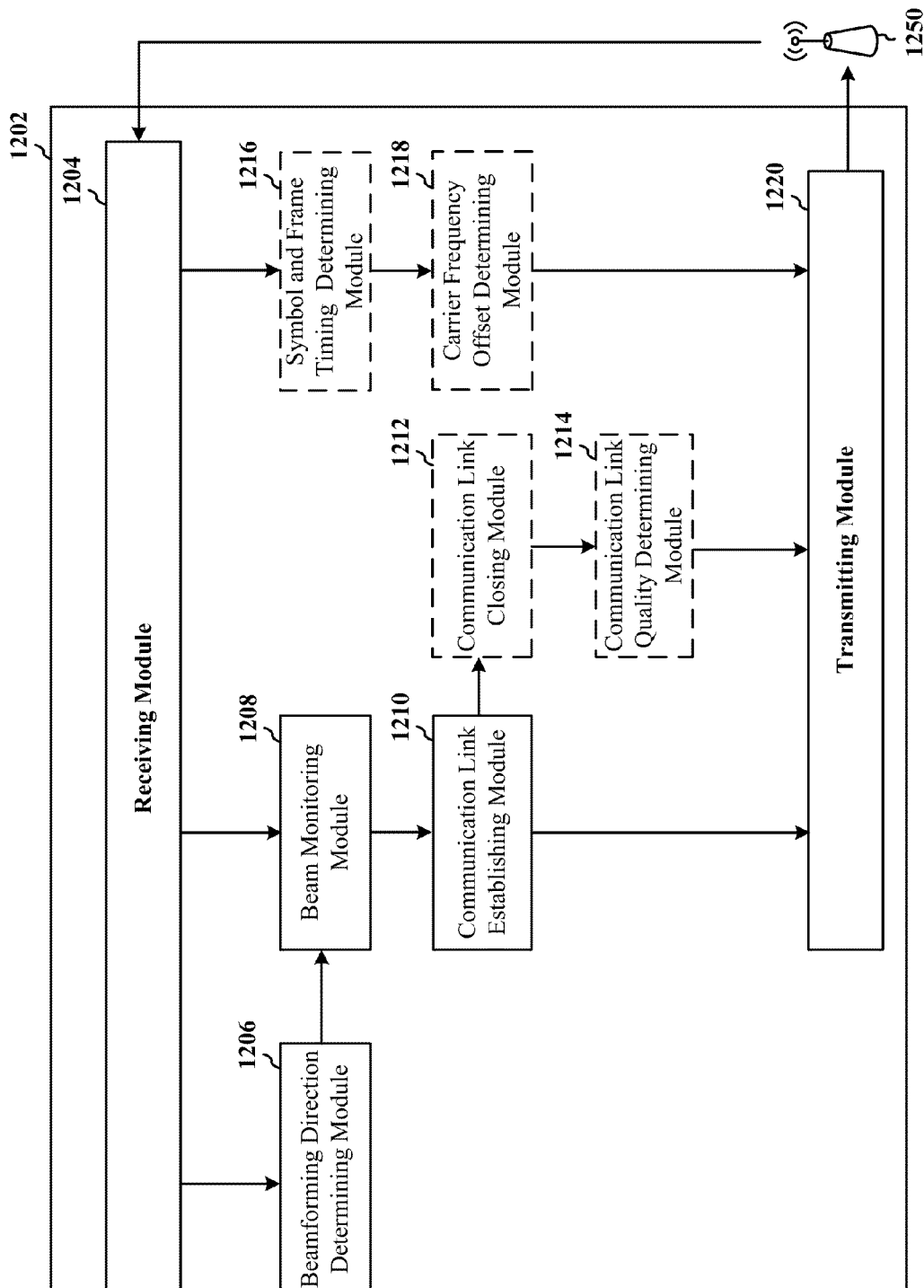
FIG. 12 is a data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE.

The apparatus includes a module 1204 that receives beams from one or more base stations (e.g., base station 1250), a module 1206 that determines a first set of beamforming directions for communication with a BS in a first network, a module 1208 that monitors for beams in a second set of beamforming directions for communication with an mmW-BS based on the determined first set of beamforming directions, the second set of beamforming directions including the first set of beamforming directions, the mmW-BS being in a second network having a higher carrier frequency than the first network, a module 1210 that establishes a communication link with the mmW-BS based on a beamforming direction in the second set of beamforming directions, a module 1212 that closes a communication link with the first network, a module 1214 that determines that a quality of the established communication link is below a threshold, a module 1216 that determines a symbol and frame timing of the first network, a module 1218 that determines a carrier frequency offset of the first network, and a module 1220 that sends information to a network controller requesting to communicate through the first network.

The apparatus may include additional modules that perform each of the steps of the algorithm in the aforementioned flow chart of FIG. 11. As such, each step in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
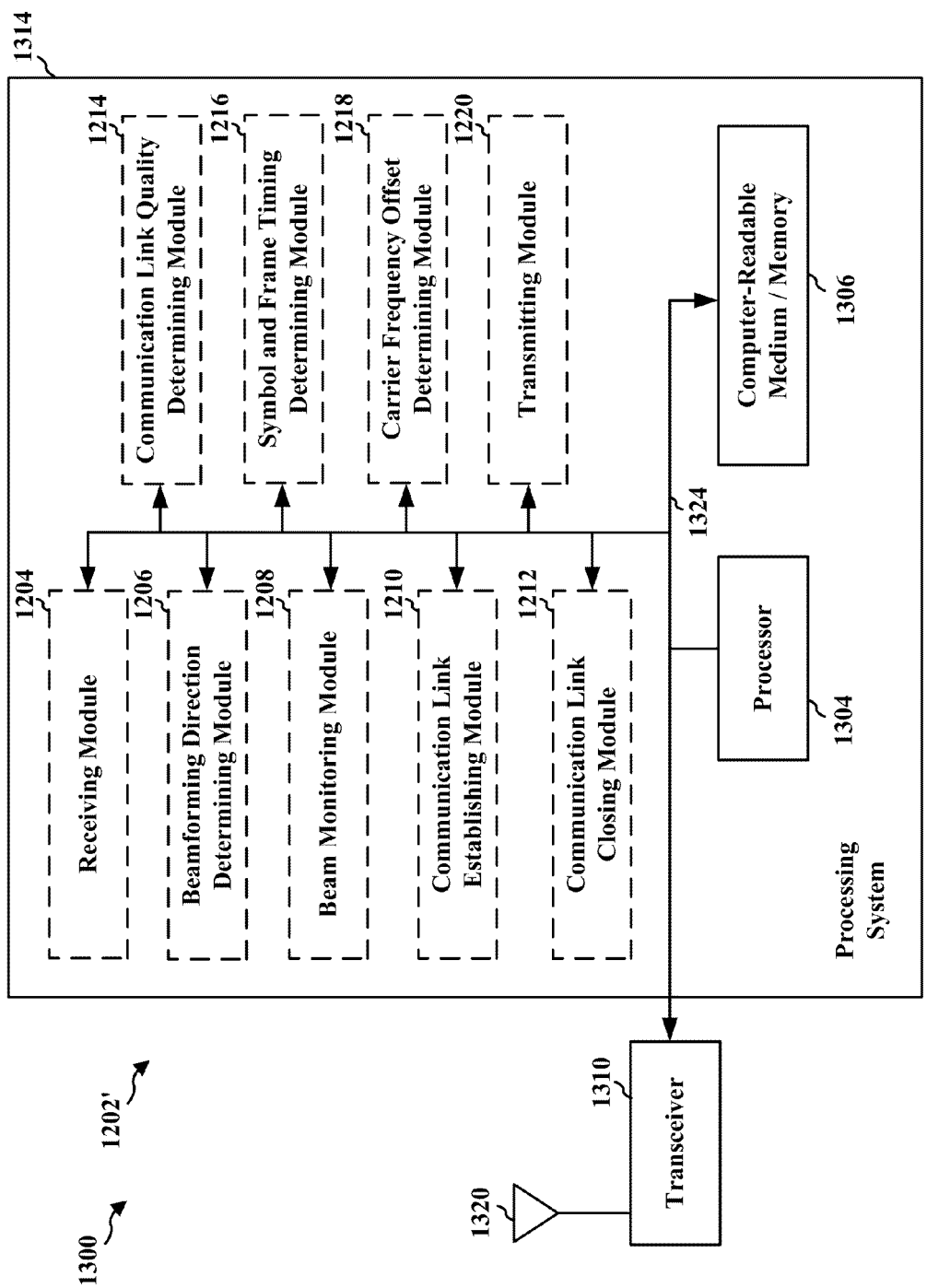
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, 1214, 1216, 1218, and 1220, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1204. In addition, the transceiver 1310 receives information from the processing system 1314, specifically the transmitting module 1220, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, 1210, 1212, 1214, 1216, 1218, and 1220. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for determining a first set of beamforming directions for communication with a BS in a first network, means for monitoring for beams in a second set of beamforming directions for communication with an mmW-BS based on the determined first set of beamforming directions, the second set of beamforming directions including the first set of beamforming directions, the mmW-BS being in a second network having a higher carrier frequency than the first network, means for establishing a communication link with the mmW-BS based on a beamforming direction in the second set of beamforming directions, means for closing a communication link with the first network, means for determining that a quality of the established communication link is below a threshold, means for sending information to a network controller requesting to communicate through the first network, means for determining at least one of a carrier frequency offset or a symbol and frame timing of the first network, means for determining at least one of a second carrier frequency offset or a second symbol and frame timing for the second network based on the at least one of a carrier frequency offset or a symbol and frame timing of the first network. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining a first set of beamforming directions for communication with a base station (BS) in a first network;
   monitoring for beams in a second set of beamforming directions for communication with a millimeter wave base station (mmW-BS) based on the determined first set of beamforming directions, the second set of beamforming directions including the first set of beamforming directions, the mmW-BS being in a second network having a higher carrier frequency than the first network;
   establishing a communication link through the second network with the mmW-BS based on a beamforming direction in the second set of beamforming directions; and
   sending information to a network controller requesting to communicate through the first network based on a quality of the established communication link.

2. The method of claim 1, wherein the first set of beamforming directions correspond to a first set of antennas and the second set of beamforming directions correspond to a second set of antennas.

3. The method of claim 2, wherein the first set of antennas is a subset of the second set of antennas.

4. The method of claim 1, further comprising:
   closing a communication link with the first network after establishing the communication link through the second network; and
   determining that a quality of the established communication link is below a threshold, wherein the sending of the information to the network controller is based on the determining that the quality of the established communication link is below a threshold.

5. The method of claim 1, further comprising:
   determining at least one of a carrier frequency offset or a symbol and frame timing of the first network; and
   determining at least one of a second carrier frequency offset or a second symbol and frame timing for the second network based on the at least one of a carrier frequency offset or a symbol and frame timing of the first network.

6. An apparatus for wireless communication, comprising:
   means for determining a first set of beamforming directions for communication with a base station (BS) in a first network;
   means for monitoring for beams in a second set of beamforming directions for communication with a millimeter wave base station (mmW-BS) based on the determined first set of beamforming directions, the second set of beamforming directions including the first set of beamforming directions, the mmW-BS being in a second network having a higher carrier frequency than the first network;
   means for establishing a communication link with the mmW-BS based on a beamforming direction in the second set of beamforming directions; and
   means for sending information to a network controller requesting to communicate through the first network based on a quality of the established communication link.

7. The apparatus of claim 6, wherein the first set of beamforming directions correspond to a first set of antennas and the second set of beamforming directions correspond to a second set of antennas.

8. The apparatus of claim 7, wherein the first set of antennas is a subset of the second set of antennas.

9. The apparatus of claim 6, further comprising:
   means for closing a communication link with the first network after establishing the communication link through the second network; and
   means for determining that a quality of the established communication link is below a threshold, wherein the means for sending the information to the network controller is configured to send the information based on determining that the quality of the established communication link is below the threshold.

10. The apparatus of claim 6, further comprising:
    means for determining at least one of a carrier frequency offset or a symbol and frame timing of the first network; and
    means for determining at least one of a second carrier frequency offset or a second symbol and frame timing for the second network based on the at least one of a carrier frequency offset or a symbol and frame timing of the first network.

11. An apparatus for wireless communication, comprising:
    a memory; and
    at least one processor coupled to the memory and configured to:
      determine a first set of beamforming directions for communication with a base station (BS) in a first network;
      monitor for beams in a second set of beamforming directions for communication with a millimeter wave base station (mmW-BS) based on the determined first set of beamforming directions, the second set of beamforming directions including the first set of beamforming directions, the mmW-BS being in a second network having a higher carrier frequency than the first network;
      establish a communication link with the mmW-BS based on a beamforming direction in the second set of beamforming directions; and
      send information to a network controller requesting to communicate through the first network based on a quality of the established communication link.

12. The apparatus of claim 11, wherein the first set of beamforming directions correspond to a first set of antennas and the second set of beamforming directions correspond to a second set of antennas.

13. The apparatus of claim 12, wherein the first set of antennas is a subset of the second set of antennas.

14. The apparatus of claim 11, wherein the at least one processor is further configured to:
- close a communication link with the first network after the establishment the communication link through the second network; and
- determine that a quality of the established communication link is below a threshold, wherein the information is sent to the network controller based on the determination that the quality of the established communication link is below a threshold.

15. The apparatus of claim 11, wherein the at least one processor is further configured to:
- determine at least one of a carrier frequency offset or a symbol and frame timing of the first network; and
- determine at least one of a second carrier frequency offset or a second symbol and frame timing for the second network based on the at least one of a carrier frequency offset or a symbol and frame timing of the first network.

16. A non-transitory computer-readable medium storing computer-executable code for wireless communication, comprising code to:
- determine a first set of beamforming directions for communication with a base station (BS) in a first network;
- monitor for beams in a second set of beamforming directions for communication with a millimeter wave base station (mmW-BS) based on the determined first set of beamforming directions, the second set of beamforming directions including the first set of beamforming directions, the mmW-BS being in a second network having a higher carrier frequency than the first network;
- establish a communication link with the mmW-BS based on a beamforming direction in the second set of beamforming directions; and
- send information to a network controller requesting to communicate through the first network based on a quality of the established communication link.

17. The computer-readable medium of claim 16, wherein the first set of beamforming directions correspond to a first set of antennas and the second set of beamforming directions correspond to a second set of antennas.

18. The computer-readable medium of claim 17, wherein the first set of antennas is a subset of the second set of antennas.

19. The computer-readable medium of claim 16, further comprising code to:
- close a communication link with the first network after the establishment of the communication link through the second network; and
- determine that a quality of the established communication link is below a threshold, wherein the information is sent to the network controller based on the determination that the quality of the established communication link is below a threshold.

20. The computer-readable medium of claim 16, further comprising code for:
- determine at least one of a carrier frequency offset or a symbol and frame timing of the first network; and
- determine at least one of a second carrier frequency offset or a second symbol and frame timing for the second network based on the at least one of a carrier frequency offset or a symbol and frame timing of the first network.

* * * * *